Feb. 2, 1943.    E. C. HORTON    2,310,177
WIPER BLADE FORMING MACHINE AND PROCESS
Filed Jan. 26, 1939    2 Sheets-Sheet 1

INVENTOR
ERWIN C. HORTON
BY
Beau, Brooks, Buckley & Beau.
ATTORNEYS

Feb. 2, 1943. E. C. HORTON 2,310,177
WIPER BLADE FORMING MACHINE AND PROCESS
Filed Jan. 26, 1939 2 Sheets-Sheet 2

INVENTOR
ERWIN C. HORTON
BY
Bean, Brooks, Buckley & Bean.
ATTORNEYS

Patented Feb. 2, 1943

2,310,177

UNITED STATES PATENT OFFICE 2,310,177

WIPER BLADE FORMING MACHINE AND PROCESS

Erwin C. Horton, Hamburg, N. Y., assignor to Trico Products Corporation, Buffalo, N. Y.

Application January 26, 1939, Serial No. 252,971

12 Claims. (Cl. 153—1)

This invention relates to a method and machine for manufacturing rubber articles in which metal parts are attached by clamping pressure to the rubber parts. More particularly the invention relates to the manufacture of wiping blades for cleaning windshields of motor vehicles.

The present invention has for its primary object to provide an improved method and means for manufacturing windshield wipers of the squeegee type by which the efficiency of the wiper is materially increased and the production of the article facilitated and expedited in a commercially practical manner.

More particularly the invention involves means and steps by which the wiping edge of the blade is rendered true and accurate in its manufacture so as to insure uniformity of the article in mass production.

In the drawings which show one embodiment of the present invention—

Figures 1, 3:
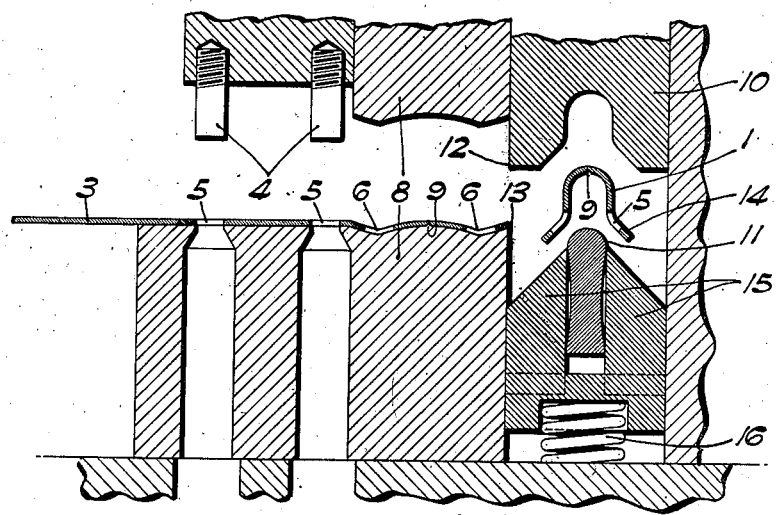
Fig. 1 is a diagrammatic sectional view illustrating the shaping of the channeled holder or backing member for the rubber insert or squeegee of the blade.
Fig. 3 is a fragmentary sectional view showing the step of uniting the holder and the rubber element.
Figure 2:
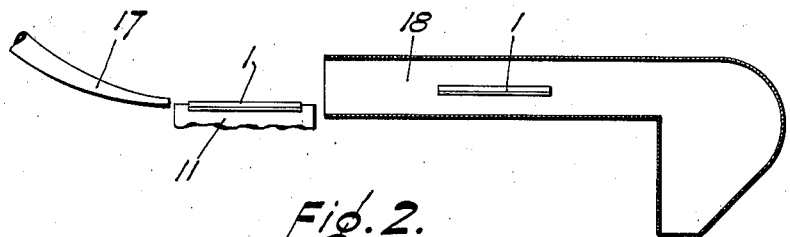
Fig. 2 is a diagrammatic view depicting the removal of the shaped holder from the shaping machine.
Figure 4:
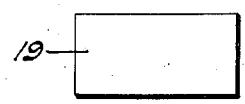
Fig. 4 is a detailed perspective view of the suction holding means for the rubber insert.
Figure 5:
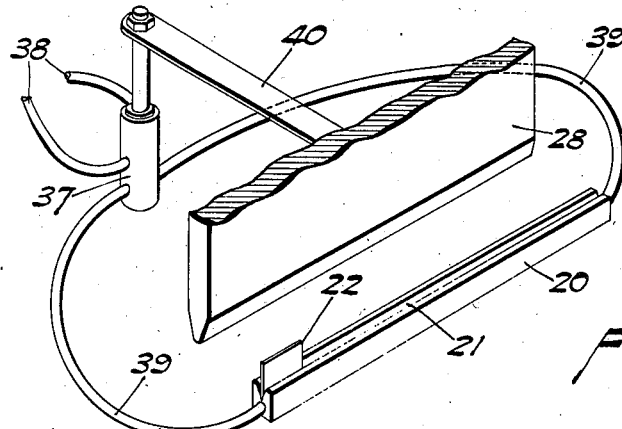
Fig. 5 is a sectional view of the control valve therefor.
Figure 6:
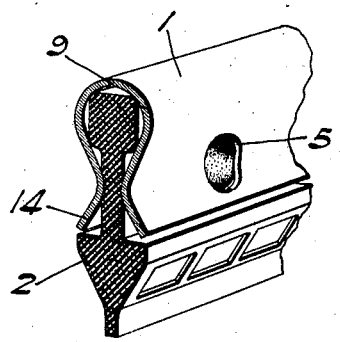
Fig. 6 is a fragmentary perspective view of the completed article.

Referring more particularly to the drawings, the channeled holder or backing member 1 for the rubber insert or wiper body 2 is preferably struck from sheet metal, the sheet metal strip stock 3 feeding into the machine, generally depicted in Fig. 1, for several operations, the first of which is performed by the punches 4 which perforate the central portion, as at 5, for the attachment of the usual clip (not shown) by which the blade is interlocked with its actuating arm on the vehicle windshield. After the perforation the stock material is fed between shaping dies 8 which preliminarily shape the stock transversely with grooves 6 adjacent the margin forming portions of the holder before severing the same from the stock. The object of this shaping step is two-fold: first, to shape such marginal portions so as to afford an outward flare or roll to the sides of the completed holder and, second, to provide a weakened area along the back portion of the holder, such as by scoring or grooving the center portion, as at 9. The purpose of this scoring is to definitely locate a line of bend to facilitate the channel shaping which is later accomplished by a second set of shaping dies, 10 and 11.

After the preliminary shaping by the dies 8 the partially shaped blank is fed between the dies 10 and 11 and there severed from the remaining stock by the cutters 12 and 13, preferably as the die part 10 descends onto the anvil part 11. The severing operation immediately precedes the channel shaping operation of the dies, and after such severing action the continued descent of the die part 10 will shape the channel about the fixed anvil part 11, such bending imparting to the holder blank the channeled shape substantially as depicted in Fig. 1. The flare of the margins 14 of the channeled holder is the result of the preliminary shaping effected by the die parts 8, and in order to maintain this flare the cooperating die parts 10 and 11 are correspondingly shaped.

Ejecting means are provided for removing or dislodging the partially shaped blank from the anvil part 11, such means comprising a pair of lifter parts 15 which straddle the anvil and may be yieldably supported as a unit by one or more springs 16. When the die part 10 descends to sever the blank from the stock material and thereafter shape the severed part about the anvil part 11, the flared margins 14 seat upon the correspondingly shaped upper faces of the lifter parts and depress them to permit such shaping of the holder. This receding movement is followed by an upward ejecting movement of the lifter parts, as the die part 10 ascends, to lift the blank or channel from off the anvil part.

After the channel 1 is formed it is then united to the wiper body 2, for which purpose the channel is placed over the back of the insert and its sides pressed into clamping embrace therewith. This sequence of steps may follow mechanically, although herein the channels are manually placed over the inserts. For this reason the channels are discharged from the shaping machine by a fluid stream issuing from a nozzle 17 which blows the channels 1 transversely through a duct 18 into a collection receptacle 19. The action is accomplished expeditiously, and by reason of the quick return of the ejector the channel is practically thrown free of the anvil and into the issuing air stream which latter is preferably intermittent in its action, being timed with respect to the functioning of the ejector.

For supporting the rubber body during the application of the channeled holder a fixed insert support 20 is provided, the same having a seat 21 in which the body is positioned with one end abutting a stop 22 and its wiping edge fitting a narrow groove 23. Clamping pressure is provided to firmly hold the insert accurately positioned during the application of the holder. This is preferably done by fluid pressure and therefore the groove has communication through a slit 24 in its bottom with a suction duct 25, with the result that suction or a pressure differential will act to hold the insert firmly engaged with the bottom flat face of the groove 23 to true the wiping edge during the clamping of the channel.

The channeled holder is placed in an inverted position over the back of the insert and clamped thereto by bringing together a pair of jaws 26 and 27. This may be accomplished by a suitable power actuator, such as the wedge 28 which enters between the cam surfaces 29 to impart closing movement to the jaws 26 and 27. The jaw 26 is carried by a slidable head 30 on which one of the cam faces 29 is directly formed, while the companion jaw 27 is carried on a slidable head 31 which in turn is connected by one or more rods or bolts 32 to a slide member 33 on which the opposing cam surface 29 is formed. Spring means 34 serve normally to separate the jaws 26 and 27. When the actuator 28 descends between the cam surfaces 29 the slidable heads 30 and 31 will carry the clamping jaws 26 and 27 against the sides of the holder and cause the latter to firmly embrace the insert. As the actuator ascends, the spring means 34 will tend to separate the jaws and bring the cam surfaces 29 toward one another for the successive operation.

In order to conserve the supply of suction as well as to facilitate the positioning of the insert and the removal of the completed blade from its seat, means are provided for applying the suction grip only during the interval when the channel is being clamped thereto and thereafter venting the duct 25 to the atmosphere. For this purpose the valve 36 is caused to operate within the housing 37 to open communication between the suction supply line 38 and the branch conduits 39. The valve is timed to open such communication as the actuator 28 descends and for this purpose it is shown in the drawings as being connected by an arm 40 to the actuator so as to move therewith. When in its raised position the hose connections 39 are vented through valve port 41 and hole 42 in the housing. The conduits 39 leading to the pneumatic grip may communicate at opposite ends of the duct 25 for greater efficiency in holding the wiping edge evenly throughout its entire length while the channeled holder is being clamped about the upper or back edge thereof, the slit 23 being substantially coextensive with the wiping edge.

The insert body may be either of ply formation or molded. The weakened area 9 serves to define and definitely locate the line of bend as the sides of the channel are being pressed against the interposed insert. This provision insures the sides of the channel being pressed evenly together to bring the openings 5 into proper registry for accurate placement of the attaching clip. This is important in that an improper placement of the clip with respect to the wiping edge may cause the blade to chatter across the windshield when in operation.

While the foregoing description has been given in detail it is not the intention thereby to restrict the invention since the latter may obviously be incorporated in other physical embodiments as manufacturing requirements may dictate.

I claim:

1. A squeegee machine comprising a support having a seat for receiving the transverse wiping edge of a squeegee body, suction means communicating with a source of suction operable in such manner to pneumatically conform the wiping edge to the seat by suction when the suction is applied, means for affixing a reinforcing back member to the body while the wiping edge is so pneumatically acted upon, and means for interrupting the suction communication to release the body.

2. A squeegee machine comprising a support having a seat having a flat face for receiving the transverse wiping edge of a squeegee body in facial contact therewith, suction means acting pneumatically on the transverse wiping edge to conform its face to that of the flat seat, means for affixing a reinforcing back member to the body, and means operable by the affixing means for establishing communication between the suction means and a connected source of suction for so holding the body during the affixing of the back member.

3. The method of making squeegees, comprising supporting a yieldable wiping body by its wiping edge only with the latter held under pressure against a straight edge to true the same, and concurrently placing a channeled metal holder over the unsupported back edge of the wiping body with a portion of the channel weakened to delineate a line of fold and then bending the sides of the holder into firm embrace with the opposite sides of the wiping body at points as determined by the line of fold and at a distance spaced from and between the wiping and back edges to maintain the wiping edge true in the finished product.

4. A squeegee machine comprising a support having a flat face providing a straight edge for truing the wiping edge of a yieldable squeegee body, means adapted for communicating with a source of suction and operating in such manner as to pull the wiping edge against the flat face in conformity therewith, means for affixing a reinforcing backing member to the body, and means for establishing such communication between the seat and the source of suction preliminary to and maintaining such communication throughout the operation of said affixing means.

5. A squeegee machine comprising a support having a seat for receiving the wiping edge of a yieldable squeegee body, said seat having a transverse flat face against which the wiping edge may be trued throughout its length, said face having means communicating with a source of suction in such manner that the wiping edge will be pneumatically held against the face when the suction is applied, means for affixing a reinforcing backing member to the body, means for establishing such communication between the seat and the source of suction preliminary to and maintaining such communication throughout the operation of said affixing means, and means for venting the seat to the atmosphere subsequently to release the finished product.

6. A squeegee machine comprising a support having a seat for receiving the wiping edge of a resilient squeegee body, said seat having a transverse flat face against which the wiping edge may be trued throughout its length, said face having means communicating with a source of suction in such manner that the wiping edge will be drawn down and pneumatically held against the face when the suction is applied, means for affixing a reinforcing backing member to the body, and common means acting initially to establish such communication and then while maintaining the communication to effect operation of said affixing means.

7. The method of making a squeegee, consisting in punching a portion of a holder blank for attachment of an arm coupling part, providing the blank with a weakened fold area bearing a definite relation to the punched portion and to opposite clamping margins thereby to accurately position the arm coupling part in the completed squeegee, then truing the wiping edge of a flexible wiping strip against a straight edge, and finally and while so holding the wiping edge trued in then folding the blank at the weakened fold area and over the back edge of a wiping strip to bring the opposite clamping margins in direct opposition to each other and in firm embrace with the interposed wiping strip.

8. The method of making a squeegee, consisting in shaping a holder blank with a pair of convex marginal clamping portions, providing a line of bend midway between the portions whereby upon bending the blank into channel form the convex portions will be in direct opposition, supporting a yieldable wiping strip by its wiping edge and with the latter held against a straight edge to true the same, and then while so supporting the wiping edge folding the blank over the free back edge of the strip to bring the convex portions in clamping embrace with the sides of the strip to secure the wiping edge of the yieldable strip so trued.

9. A squeegee making machine comprising a support having a seat for receiving the wiping edge only of a squeegee rubber-like body, the seat having a transverse flat face providing in effect a straight edge against which the wiping edge is trued, suction means communicating with a source of fluid pressure and operable to press the wiping edge conformably upon the flat face of the seat by the direct action of the fluid, the opposite edge of the rubber body being free and unsupported, and means for affixing a reinforcing backing member to the free edge of the rubber body during the pneumatic truing of the wiping edge by said suction means.

10. The method of manufacturing a wiper blade having a yieldable rubber-like wiping body reinforced by a channeled backing, consisting in acting directly on the wiping edge portion only of the body to conform the wiping edge thereof to a straight surface for truing the wiping edge while leaving the remaining portion of the body free to follow any distorting stress of compression or tension on said remaining portion incidental to the edge truing operation, and then while so holding the wiping edge trued by such direct action thereon in applying the channeled backing over the opposite edge of the body in clamping embrace with the sides of said remaining portion of the body to support the latter in its drawn or pressed condition, if any, and thereby maintain the trued condition of the wiping edge.

11. The method of manufacturing a wiper blade having a yieldable rubber-like wiping body of strip-like form reinforced by a backing holder, consisting in supporting the body on its wiping edge with the back edge free, then pneumatically drawing the wiping edge against a straight edge to true the wiping edge, and finally while so holding the wiping edge true clamping a reinforcing holder over the back edge to secure the trued condition of the wiping edge.

12. The method of attaching a reinforcement to a rubber-like wiping body of strip-like form, consisting in supporting the rubber-like body along its wiping edge in a seat conforming thereto by the application of suction to pull the wiping edge in the plane of the strip against a straight edge in the seat for truing the wiping edge, concurrently affixing the reinforcement about the opposite edge to preserve the trueness of the suction-held wiping edge when released, and finally releasing the wiping edge from the suction pull.

ERWIN C. HORTON.